3,234,166
BENZENE-SOLUBLE AND BENZENE-INSOLUBLE CIS-1,4 POLYISOPRENE

Kenneth C. Hecker, Akron, Ohio, assignor to The Goodyear Tire & Rubber Company, Akron, Ohio, a corporation of Ohio No Drawing. Filed Apr. 4, 1962, Ser. No. 184,953
1 Claim. (Cl. 260—29.7)

This invention relates to an improved latex of a solution-polymerized diene rubber, a process for its manufacture and uses thereof.

A gum rubber film laid down from a man-made rubber latex and particularly from a latex made from a benzene-soluble polydiene and particularly polyisoprene containing at least 50% of cis-1,4 polyisoprene is deficient in certain physical properties and particularly with respect to the moduli at elongations ranging from 50% to 100%. Many attempts have been made to improve the moduli by conventional methods well-known to the latex chemist, but the results obtained are not desirable for many reasons.

It has now been discovered that an improved latex of a solution-polymerized diene rubber may be made in a facile, efficient, and economical manner by providing a benzene-soluble solution-polymerized diene rubber with a desirable content of a benzene-insoluble, highly cross-linked, solution-polymerized diene rubber, generally referred to as "gel," and then converting this mixture to a latex in a conventional manner.

In the accepted commercial practice of manufacturing artificial latex dispersions of rubber, the procedure consists primarily in milling the rubber for a period of time and at a certain temperature to break down any gel content present and then dissolving the milled rubber in any suitable solvent, such as benzene, to form a benzene cement or solution of the rubber. The cement is then emulsified with water with the aid of surfactants to form the desired dispersion of small particles of rubber containing solvent in a continuous phase of water. The solvent is then stripped from the globules of emulsified rubber by a controlled heating operation or by evaporation at room temperature (70° F.), followed by concentrating the dispersion of rubber particles to a desired total solids, which usually is in the order of about 60%.

In the manufacture of a solution-polymerized diene rubber, for example, polyisoprene rubber, having a preponderance of 1,4 linkages of either the cis- or trans-variety, the rubber is formed in a solvent polymerization system and the conditions of catalysis are adjusted so that a clear cement of, for example, cis-1,4 polyisoprene rubber is produced. It is not obvious to one skilled in this art how the moduli of a film laid down from such a latex can be improved.

It has been discovered, as may be appreciated from the disclosure of the present invention, that when a certain percentage of gelled rubber of the type referred to above is associated with the benzene-soluble rubber as, for example, by being mixed with a cement of the benzene-soluble or ungelled rubber and these rubber phases, intimately mixed with each other in the cement and then converted to a latex with water in the presence of an emulsifying agent, rubber films produced therefrom are greatly improved in certain properties over the control. The control rubber is the rubber film made from the latex of the benzene-soluble rubber.

The gelled rubber phase may also be intimately associated with the ungelled rubber phase by forming the gelled rubber phase in situ during the formation of the ungelled phase during solution polymerization of the monomers selected to form the diene rubber desired.

The following example serves to illustrate the values obtained when the present invention is not followed, all parts being by weight unless otherwise identified.

*Example 1.—Control*

A latex is made by first making a gel-free 96% cis-1,4 polyisoprene cement in benzene containing 10% solids and then adding to the cement 5.5 parts of potassium oleate, 0.2 parts of the tetra sodium salt of ethylene diamine tetra acetic acid (Versene), the amount of each material being based on 100 parts of rubber. This mixture is then vigorously stirred into 1000 parts of distilled water to bring about the complete emulsification of the rubber cement in the water.

The benzene is stripped from the emulsion using a laboratory size disc evaporator which operates by revolving metal discs through the emulsion, exposing new surfaces to the atmosphere and thus evaporating the benzene. The resulting latex has a solids content of about 32% and is concentrated by centrifuging through a laboratory size De Lavall centrifuge machine to 62.7% total solids. This latex, which is a low viscosity, low surface tension liquid and completely free of gel, is compounded as follows:

| Ingredients: | Parts (dry weight) |
|---|---|
| (1) Sulfur | 2.0 |
| (2) Zinc mercaptobenzothiazole | 3.0 |
| (3) Zinc diethyldithiocarbamate | 1.0 |
| (4) Antioxidant (mixture of styrenated phenols) | 1.0 |
| (5) Diphenyl guanidine | 0.6 |
| (6) Zinc oxide | 3.0 |
| (7) Latex (62.7% solids) | 100.0 |

Items 1 to 6 were added to the latex as water dispersions or emulsions, following the normal way of compounding liquid rubber latex systems. This mass was then cooled to 55° F. and 1.0 part sodium silicofluoride as a 20% water dispersion was added with slow stirring into the latex, care being taken not to generate air bubbles in the mixture. The completed compounded latex was poured onto a glass surface and scraped to a uniform thickness. Within three minutes, the liquid latex mass coagulated into a uniform film, which, after drying, was .020 inch in thickness. This film was then cut into sections and cured in a circulating hot air oven for periods of time shown in Table I below. Stress/strain values were determined on conventional dumbbell specimens of .125 inch wide at the center test area. A standard Instron machine, operating at 5 inches/minute was used to obtain moduli and ultimate tensile and elongation properties. Table I contains the data on this experiment, which we refer to as the control.

TABLE I

| At 212° F. Vulcanization Time in Minutes | Moduli (p.s.i.) | | Ultimate Tensile (p.s.i.) | Ultimate Elongation (percent) |
|---|---|---|---|---|
| | 50% | 100% | | |
| 2 | 70 | 95 | 5,200 | 940 |
| 5 | 80 | 120 | 5,330 | 880 |
| 10 | 85 | 125 | 6,000 | 850 |
| 20 | 90 | 130 | 6,000 | 830 |
| 30 | 90 | 130 | 5,000 | 830 |

The following examples serve to illustrate the values obtained when a rubber latex is made in accordance with the present invention:

*Example 2.—21% gel rubber latex*

A second latex was made in substantially the same way as described in Example 1, except that during the solution polymerization of isoprene the 96% cis-1,4 polyisoprene polymer contained 21% by weight of benzene-insoluble, tough, high molecular weight cis-1,4 polyisoprene, which is also referred to as polyisoprene gel and 79% benzene-soluble cis-1,4 polyisoprene. The latex was made and compounded and the films tested as in Example 1. The Table II contains the data on this experiment.

TABLE II

| At 212° F Vulcanization Time in Minutes | Moduli (p.s.i.) | | Ultimate Tensile (p.s.i.) | Ultimate Elongation (percent) |
|---|---|---|---|---|
| | 50% | 100% | | |
| 2 | 70 | 95 | 4,450 | 900 |
| 5 | 82 | 120 | 5,300 | 820 |
| 10 | 90 | 130 | 5,600 | 780 |
| 20 | 95 | 135 | 6,000 | 780 |
| 30 | 98 | 135 | 6,000 | 780 |

*Example 3.—28% gel rubber latex*

A third latex was made in substantially the same manner as described in Example 2, except that during the solution polymerization of isoprene the 96% cis-1,4 polyisoprene contained 28% of benzene-insoluble gel and 72% of benzene-soluble cis-1,4 polyisoprene. Vulcanized films were made and tested in the same manner as described above. Table III contains the data of this series of samples.

TABLE III

| At 212° F Vulcanization Time in Minutes | Moduli (p.s.i.) | | Ultimate Tensile (p.s.i.) | Ultimate Elongation (percent) |
|---|---|---|---|---|
| | 50% | 100% | | |
| 2 | 80 | 124 | 5,340 | 800 |
| 5 | 90 | 140 | 6,050 | 770 |
| 10 | 95 | 148 | 5,500 | 730 |
| 20 | 100 | 150 | 5,500 | 720 |
| 30 | 100 | 150 | 5,000 | 720 |

From these data it is observed that, starting at a gel content of about 20%, the moduli at 50% and 100% elongations are increased. These moduli are very important in the making of latex products, such as foam rubber. The higher the moduli at these elongations, the higher is the stock efficiency of the resultant foam rubber.

Attempts were made to increase the moduli of the latex made in Example 1 by increasing the quantity of sulfur, accelerators, and activators, but this approach resulted in greatly decreased values for the ultimate tensile and elongation.

By having from about 20% and up to about 100% of a benzene-insoluble solution-polymerized diene rubber, for example, cis-1,4 polyisoprene gel molecularly intermixed in, for example, benzene, with from about 80% to about 1% of a benzene-soluble solution-polymerized diene rubber, for example, benzene-soluble cis-1,4 polyisoprene, and converting the intermixed phases of rubber to a latex, the resultant film vulcanizate thereof has an increased moduli not otherwise observed when using benzene-soluble diene rubber latices. The same results are obtained when from about 20% to about 100% of a separately prepared benzene insoluble solution-polymerized diene rubber is molecularly intermixed by conventional means with from about 80% to about 1% of a benzene-soluble solution-polymerized diene rubber in a solvent for the benzene-soluble rubber, mixing may be accomplished by conventional means as by the use of a homogenizer or other shear-producing mixing means, in order to produce the molecularly intermixed condition desired between the two rubber phases. By molecularly intermixed is meant the intimate association of one rubber phase with the other rubber phase, which association may also be pictured as an intertwining or interweaving or commingling or diffusion of one rubber phase with the other rubber phase.

The following example shows a method for the production of a cis-1,4 polyisoprene cement containing a high percentage of gel, all parts being by weight unless otherwise indicated.

*Example 4*

The catalyst system used to bring about the polymerization of isoprene is made by reacting 1.0 milliliter of 0.323 molar titanium tetrachloride and 1.0 milliliter of 0.323 molar triisobutyl aluminum in heptane. This catalyst is then added to 20 milliliters of isoprene confined in a glass-lined reactor provided with a stirrer and a cooling means and allowed to react to completion. At the end of the reaction time, a 52% yield of polymer is obtained, of which 28% of the polymer is a gel dispersed in the solvent.

The polymerization of isoprene may be caried out in the presence of polymerization systems which promote the production of a gel content in the finished polymer ranging from about 20% to about 65%, using temperatures ranging from about 25° C. to about 100° C. at normal ambient pressures. The amount of catalyst employed may range from about .5 milliliter to about 5 milliliters per mol of isoprene. A gel content as high as about 100% may be obtained if a blanket of nitrogen is not provied over the reaction mixture.

The polymerization of the isoprene may be carried out in any suitable solvent for the resulting polymer, including hexane, heptane, octane, isooctane, nonane, decane, benzene, naphtha, toluene, mineral spirits, cyclohexane, cyclohexene, methyl chloride, ethyl chloride, trichloroethylene, carbontetrachloride, methyl ethyl ketone, and the like. Hexane and heptane are the preferred solvents.

It has been observed that reinforcing agents, including carbon black, clay, silica, resinous polymers, such as high styrene-low diene copolymers, when properly reduced in size by conventional methods including ball milling and the like, may be added to the cement and agitated until a homogeneous mixture results. This homogeneous mixture is then converted to a latex in a manner described above, and it is observed that an unexpected result is obtained with regard to the deployment of these reinforcing agents in the rubber particles to produce a result long sought by the latex chemist, but not obtained when these reinforcing agents were added to the rubber latex.

The following example shows a method of adding carbon black to the high gel stereospecific rubber obtained in accordance with the description set forth in Example 4.

*Example 5*

To 100 parts of benzene was added 20 parts of carbon black by grinding in a ball mill until a homogeneous dispersion was obtained. 5 parts of this carbon black dispersion was added to the cement of Example 4, the amount of the material being based on 100 parts of rubber, and thoroughly agitated until a homogeneous mixture was obtained. The resulting cement was converted to a latex in the manner described above for Example 4 and a film laid down from this latex containing carbon black and found to have the following properties:

Modulus at 50% elongation _____ p.s.i__ 147
Modulus at 100% elongation _____ p.s.i__ 213
Tensile at break _____ 5300

Any other well-known reinforcing agent may be added to the cement of the stereospecific rubber of this invention to produce unexpected properties with regard to measurable quantities, including tensile strength, tear and moduli.

It is theorized that the reduction in size of the reinforcing particles, whether they be carbon black, clay, silica, resinous polymers, to a size approaching the molecular size of the rubber particles dissolved in the hexane, permits the encapsulation of these particles by the rubber particles when the cement is converted to a latex. This encapsulation of the reinforcing particles permits an unexpected cooperation between the rubber and the particles which shows up in tensile, tear and moduli that otherwise is not obtained when these same reinforcing agents are added to the rubber in its latex form.

The term "encapsulation" is not to be narrowly construed to means a complete encircling or enveloping of the reinforcing particles, but is also to mean the homogeneous dispersion of these reinforcing particles throughout the rubber particle.

During the conversion of the rubber cement to a latex using a high shear producing homogenizer, it is desirable in the production of a stable latex to control the temperature at which the converging phases of cement and water are maintained. It has been observed that the most desirable temperature is about 30° C. ±5° C. If the cement is converted to an emulsified dispersion at temperatures approaching 60° C., the resulting dispersion is relatively unstable, particularly with respect to mechanical processing and temperature changes.

Although the present invention is concerned primarily with cis-1,4 polyisoprene having a high-gel content, the compounding of the cement with a reinforcing agent is also applicable with respect to other stereospecific rubbers produced from conjugated dienes, wherein the elastomers have a high content of cis-1,4 linkages, the more useful of the cis-1,4 addition products being those prepared from isoprene and butadiene, since they have structures very similar to that of natural rubber. Processes for the polymerization of the conjugated dienes to produce cis-1,4 addition products are well-known and, in the case of the polymerization of isoprene, a catalyst system comprising any of a large variety of hydrocarbon lithium compounds may be used, and when butadiene is being polymerized, a catalyst that is the reaction of a transition metal compound, particularly a halide of a metal from Group $IV_A$, $V_A$, $VI_A$, or VIII with a strong reducing agent may be used.

While certain representative embodiments and details have been shown for the purpose of illustrating the invention, it will be apparent to those skilled in this art that various changes and modifications may be made therein without departing from the spirit or scope of the invention.

What is claimed is:

A rubber film made from a latex of a solution-polymerized polyisoprene containing at least 90% cis-1,4 polyisoprene of which about 20% to about 65% is tough, high molecular weight and benzene-insoluble and about 80% to about 35% is a benzene-soluble cis-1,4 polyisoprene.

References Cited by the Examiner

UNITED STATES PATENTS

| | | | |
|---|---|---|---|
| 2,791,572 | 5/1957 | Doak | 260—41.5 |
| 2,953,556 | 9/1960 | Wolfe et al. | 260—29.7 |

OTHER REFERENCES

Richardson, Jour. Polymer Sci., vol. 13, pages 325–328, 1954.

MURRAY TILLMAN, *Primary Examiner.*

WILLIAM SHORT, *Examiner.*